United States Patent [19]

Buscher et al.

[11] 4,205,382
[45] May 27, 1980

[54] BINARY INTEGRATOR FOR FIXED CELL RADAR ALARM DATA

[75] Inventors: David J. Buscher, Silver Spring; Marvin J. Schneider, Adelphi, both of Md.

[73] Assignee: The United States of America as represented by the Secretary of the Army, Washington, D.C.

[21] Appl. No.: 8,808

[22] Filed: Feb. 2, 1979

[51] Int. Cl.² .............................................. G01S 9/44
[52] U.S. Cl. ..................... 364/516; 340/146.2; 340/524; 343/5 PD; 343/7.7
[58] Field of Search ................. 364/516, 517, 733; 343/5 PD, 7.7; 340/523, 524, 526, 539, 146.2

[56] References Cited
U.S. PATENT DOCUMENTS

| | | | |
|---|---|---|---|
| 3,967,283 | 6/1976 | Clark et al. | 343/5 PD X |
| 3,986,182 | 10/1976 | Hackett | 343/7.7 X |
| 4,124,848 | 11/1978 | Clark et al. | 340/524 |

Primary Examiner—Jerry Smith
Attorney, Agent, or Firm—Nathan Edelberg; Robert P. Gibson; Saul Elbaum

[57] ABSTRACT

A method for performing binary integration of fixed cell radar alarm data. In order to determine whether M cell alarms have occurred in the last N processing intervals a memory is provided which is N bits wide by K words long, where K is the number of cells. Binary 1's are placed in memory positions corresponding to timing intervals at which alarms have occurred and binary 0's are placed in positions corresponding to timing intervals at which alarms have not occurred. A serial comparison with a register having M bits stored is made to determine which of the words contains at least M binary 1's.

3 Claims, 4 Drawing Figures

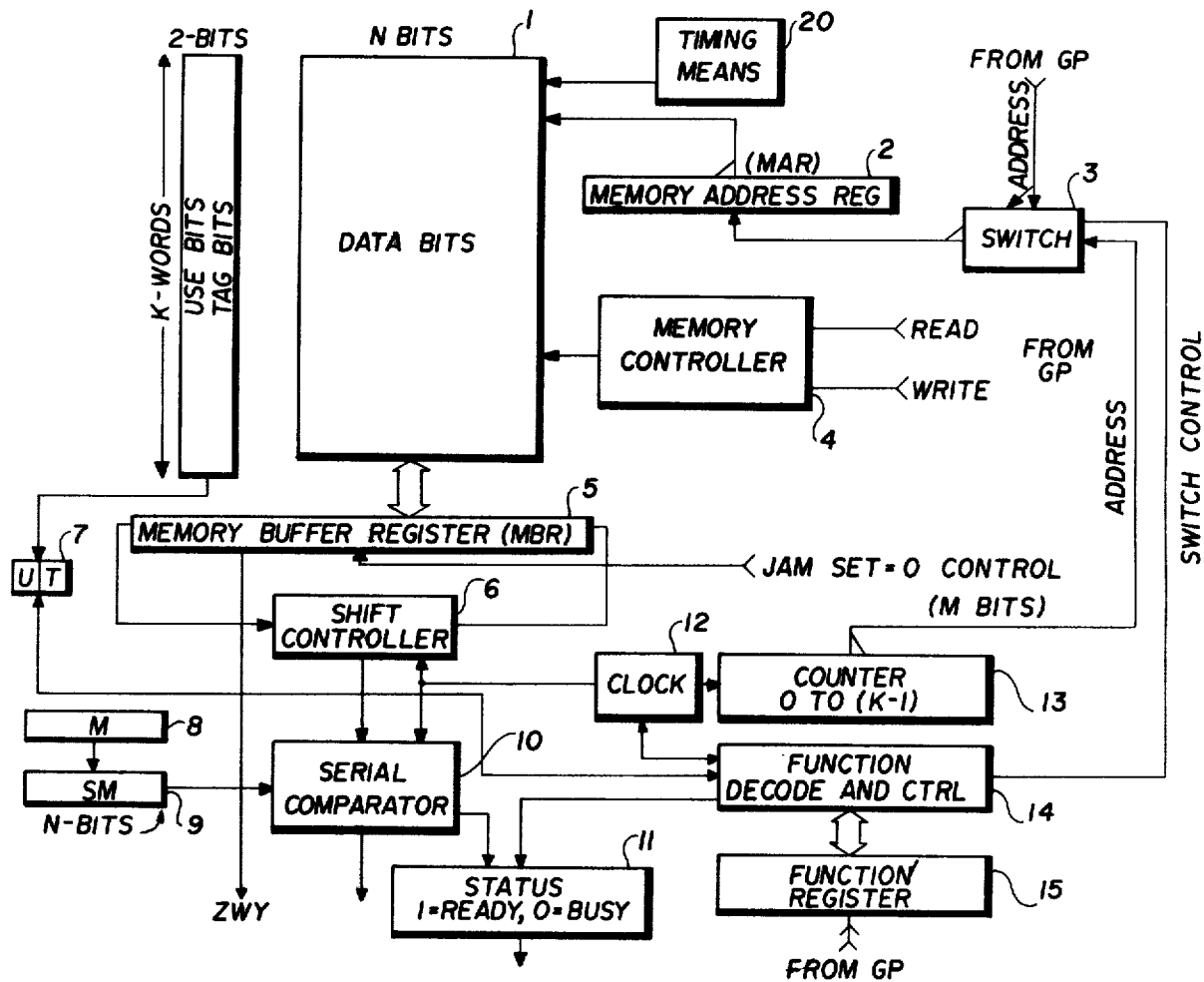

BINARY INTEGRATOR FOR FIXED CELL RADAR ALARM DATA

RIGHTS OF THE GOVERNMENT

The invention described herein may be manufactured, used, and licensed by or for the United States Government for governmental purposes without the payment to us of any royalty thereon.

The present invention is directed to a binary integration method for fixed cell radar alarm data, which utilizes electronic hardware apparatus.

In radar systems, the area of interest is frequently divided up into a plurality of contiguous incremental cells, each of a given area. The range resolution of the radar is such that when an alarm occurs, it is known that the target is present in the area of one of the cells, but its exact position in the cell is not known.

The raw alarm data is converted to digital form and is then processed to arrive at the desired information. As part of this processing, a binary integration procedure is sometimes employed. Binary integration is the process of determining for each cell, whether M alarms have occurred in the last N processing intervals, where $M \leq N$. The purpose of the binary integration is to determine the pattern of movement of ostensible targets so that real targets can be discriminated from spurious ones.

In the prior art, the binary integration process has been performed by appropriate programming of the general processor computer, which computer usually has many other functions to perform in the radar system. The purpose of the present invention is to provide a method utilizing a hardware apparatus for performing the binary integration in real time, which can be used instead of the general processor, thus releasing the general processor for other tasks which must be performed.

It is thus an object of the invention to provide a hardware method and apparatus for performing binary integration of cell alarm data in real time.

The invention will be better understood by referring to the accompanying drawings in which:

FIG. 1 is a drawing of a word in a memory, which is useful in explaining the principle of operation of the present invention.

FIG. 2 is a drawing of the same word as FIG. 1, one time interval later.

FIG. 3 is a drawing which illustrates a technique for determining if as many as M binary 1's are present in a word such as is shown in FIGS. 1 and 2.

FIG. 4 is a block diagram of hardware which can be used to effect the binary integration.

As discussed above, binary integration is the process of determining whether M cell alarms have occurred during the last N processing times where $M \leq N$. To keep a running count of the alarms, it is necessary to maintain an indication as to when the alarms have occurred during the last N processing times.

According to the present invention, bits corresponding to cell alarms are shifted into a memory which is N bits wide, information is stored for the last N time intervals, and a comparison is made after each time interval, to determine whether or not M cell alarms have occurred during the last N processing times.

An illustrative memory 1 is shown in FIG. 4, and is seen to be N bits wide by K words long, where there are K cells of interest. As discussed above, each cell is representative of a given area, and when a cell alarm corresponding to one of the K cell area occurs, it is known that a target is present somewhere in the cell area, but its exact location within the cell is not known. As cell alarms occur, binary 1's which correspond to the alarms, are routed to the particular words in the memory which correspond to the cells in which the alarms have occurred.

In a typical application, the number of data bits per word in the memory may vary from 8 to 32. To illustrate the method involved, an 8-bit word will be utilized, with the understanding being that the word length can easily be expanded. FIG. 1 is an illustrative example of what a word in the memory 1 might look like. In the example of FIG. 1, it is seen that alarms have occurred at times $t_0$, $t_1$, $t_3$, $t_4$, and $t_7$, while no alarms have occurred at times $t_2$, $t_5$, and $t_6$. At time $t_8$, the most significant bit (MSB) is shifted out of the left side of the word, and the value for $t_8$ is shifted in the right side of the word. If there were no alarms at time $t_8$, then the new word would look like the word which is depicted in FIG. 2.

As will be understood from FIGS. 1 and 2, the time over which the binary integration takes place is divided up into equal time intervals, such as by a suitable electronic means. Besides the data bits, each word has a tag bit associated with it. At the beginning of each time interval, before any alarms are processed, all tag bits are set equal to zero. If during the processing interval, an alarm is received for a cell, then a binary 1 is shifted into the right side of the word and the tag bit associated with the word is set. Additionally, each word has a use bit associated with it, and the use bit is set to 1 when the word is currently being used and is set to zero when it is intended that the word may be ignored.

The technique according to the present invention consists of (1) clearing all tag bits at the start of each processing interval, (2) as a cell or cells alarm, placing a binary 1 into bit 0 of the word or words which correspond to the cells which have alarmed, shifting the information already in those words one bit to the left, and setting the tag bit of each such word, (3) at the end of each processing interval, checking all tag bits, and shifting a binary 0 into bit 0 of all the words having tag bits which are not set, shifting the information already in the words one bit to the left, and (4) determining which of the resulting words has at least M bits equal to 1.

The technique for determining whether at least M binary 1's are present in a word is illustrated in FIG. 3. In that figure the top register is denoted as the M register or SM. At the beginning of the binary integration process, the M register is loaded with the desired M number of bits which are left-justified in the register. Since the comparison process involves down-counting or decrementing, so that the information is not lost from the M register, a supplementary SM register is provided. Hence, the number of M is always maintained in the M register during the process, while information is shifted in and out of the SM register, thus insuring that the number M is not lost during operation.

To determine if any given word in the memory has at least M binary 1's, the word is first transferred to the memory buffer register, which is the lower register shown in FIG. 3. Then, if bit 7 of the memory buffer register is a binary 0, the memory buffer register is shifted left by one bit. If bit 7 of the memory buffer register is a binary 1, then the memory register is shifted left by one bit and the SM register is also shifted left by one bit. Then, if the SM register is all 0's before N+1 shifts, it is known that there are at least M binary 1's in the word being tested.

FIG. 4 is an illustrative block diagram of an apparatus which can be used to perform the binary integration in conjunction with a general processor. As cells alarm, the general processor determines the cell locations, and addresses memory address register 2 through switch 3 with the appropriate locations. This function of the general processor as well as the others described below are trivial programming problems, and programs exist to perform these functions.

Functions in the form of coded signals are fed into function register 15 from the general processor, there being a different coded function signal for each of the various steps discussed above. For instance, during the time that the general processor is inputing memory addresses of alarms which are occurring, to memory address register 2, the function inputted from the general processor is such, that after being decoded by decoder 14, an output on the switch control line exists which is effective to close switch 3 to the address output of counter 13 and to open the switch to the address output of the general processor.

Timing means 20, which includes a clock, is effective to generate timing signals, thereby defining the processing intervals. Memory controller 4, which receives appropriate inputs from the general processor, is effective to control the read/write function of the memory, which, of course, would be different depending on whether a core or semiconductor memory is utilized.

In order to shift bits in the memory, a memory buffer register 5 in conjunction with a shift controller 6 is utilized. Every time it is desired to shift the bits in a word, the word is outputted to memory buffer register 5, and is shifted through shift controller 6, back to the buffer register 5, and then back to the appropriate word position in memory 1. In the alternative, a group of shift registers can be used as the memory, although this would be much more expensive.

Clock 12 and counter 13 are provided in order to successively address the memory in line by line fashion to read the contents of the memory out either to register 7 or memory buffer register 5. For instance, when each of the tag bits is examined at the end of each processing interval to determine which tag bits are not set so that 0's may be inserted in the appropriate words, the tag bits associated with all of the words in memory are successively read out to the U/T register for examination by the successive K counts (0 to K −1) outputted by counter 13. During such times, the function from the general processor fed into function register 15 is such so that when decoded by decoder 14 it is effective to put the switch control line input to switch 3 in a state which is effective to route the address output of counter 13 through switch 3 instead of the address input line from the general processor. Also, when the words of the memory are successively read out to memory buffer register 5 for examination in serial comparator 10 to determine if at least M binary 1's are present in any of the words, it is counter 13 which successively addresses the memory address register 2 with the addresses of the successive K words of the memory. Memory buffer register 5 includes a jam set equals 0 control whereby all of the bits of the register can be set to binary 0's.

The serial comparator unit is known, and interfaces between the memory buffer register 5 and the SM register 9 to perform the process illustrated in FIG. 3. Indicator 11 may be provided to indicate whether the system is ready to process or whether it is busy.

We wish it to be understood that we do not desire to be limited to the exact details of construction shown and described, for obvious modifications can be made by a person skilled in the art.

What is claimed is:

1. A method of determining whether M cell alarms have occurred in the last N processing times over an area of K cells, where $M \leq N$, comprising, providing a memory which is N bits wide by K words long, said bits corresponding to the last N processing times and said words corresponding to said K cells, each of said K words in said memory having a tag bit associated therewith, defining N successive processing intervals, responsive to the occurrence of a cell alarm or alarms in one of said N processing intervals, placing a binary 1 in the end-most bit of each word which corresponds to a cell in which an alarm has occurred and shifting all information in the word one bit position in the direction away from said end-most bit, during the interval in which said alarm or alarms have occurred, setting the tag bit associated with each word which has a binary 1 in said end-most bit, determining which of said tag bits are set at the end of each processing interval, inserting binary 0's in the end-most bits and shifting all information in the word one bit position in the direction away from said end-most bit of each word which has a tag bit associated therewith which is not set, determining which of said words include at least M binary 1's and storing the addresses of said words which have at least M binary 1's.

2. The method of claim 1 wherein said step of determining which of said words includes at least M binary 1's comprises the steps of extracting each word from said memory and comparing each word with a register which is loaded with M binary 1's.

3. The method of claim 2 wherein said step of extracting each word includes the step of counting from 0 to (K−1).

* * * * *